E. N. FARNER.
AUTOMATIC HEAT REGULATOR.
APPLICATION FILED AUG. 3, 1907.
906,698.
Patented Dec. 15, 1908.
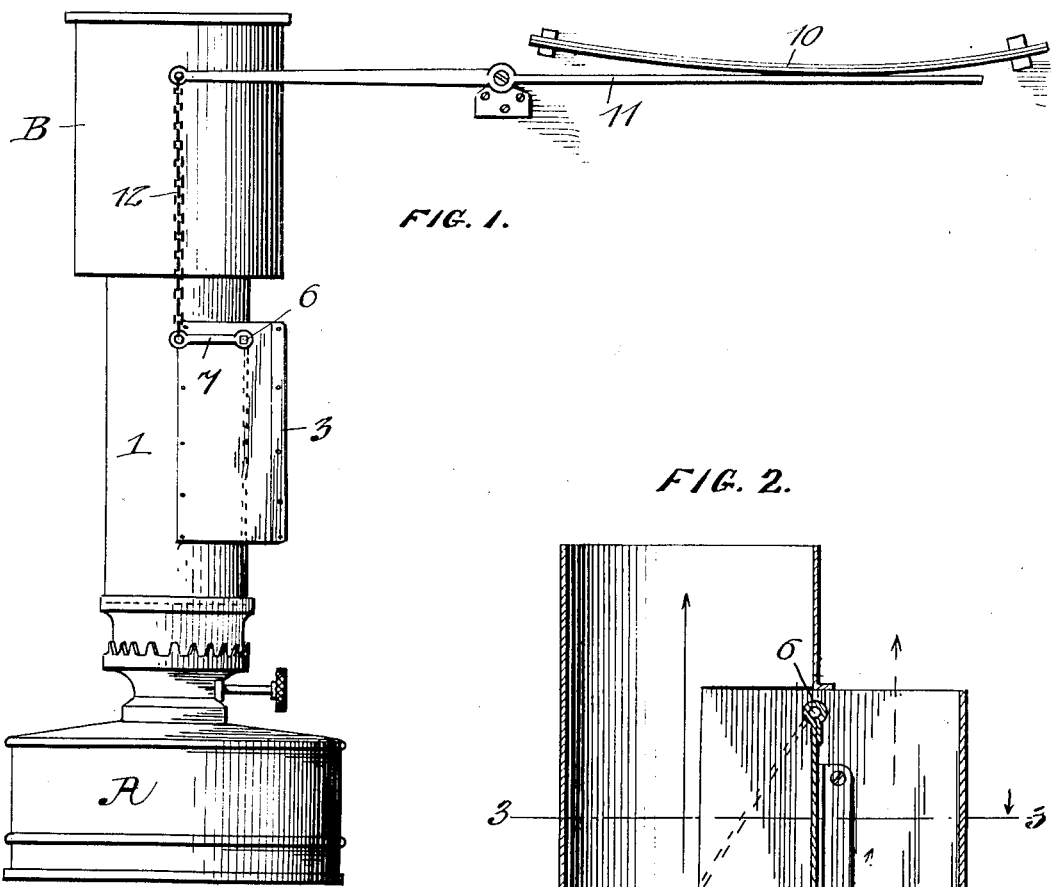
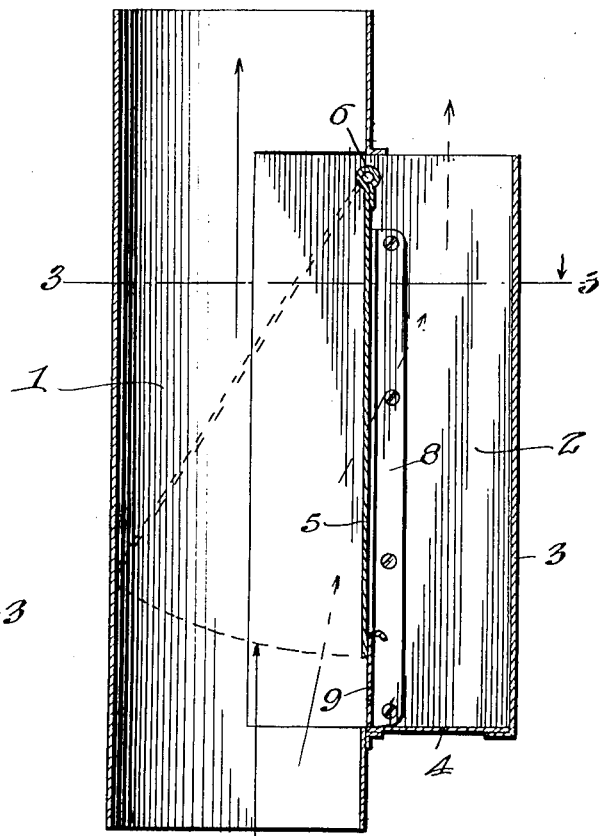
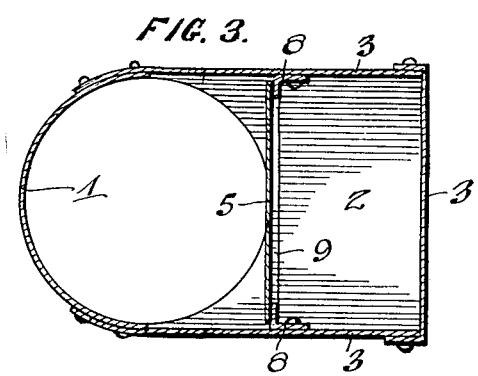
WITNESSES
Chas. K. Davis
Myron G. Clear
INVENTOR
Earl N. Farner
by C. L. Parker
Attorney

UNITED STATES PATENT OFFICE.

EARL N. FARNER, OF CLAY CENTER, NEBRASKA.

AUTOMATIC HEAT-REGULATOR.

No. 906,698.  Specification of Letters Patent.  Patented Dec. 15, 1908.

Application filed August 3, 1907. Serial No. 386,968.

*To all whom it may concern:*

Be it known that I, EARL N. FARNER, a citizen of the United States, residing at Clay Center, in the county of Clay and State of Nebraska, have invented certain new and useful Improvements in Automatic Heat-Regulators, of which the following is a specification.

My invention relates to an automatic heat regulator and particularly contemplates the provision of a device to be located within a pipe section forming the connection between an incubator, brooder or the like, and its source of heat supply.

My invention further and specifically resides in the following features of construction, arrangement and operation as will be hereinafter described with reference to the accompanying drawings forming a part of this specification, in which like numerals are used to designate like parts throughout the several figures, and in which Figure 1 is an elevation of my improved device illustrating the practical application of the same, Fig. 2 is a central vertical sectional view taken through my improved heat regulator, and Fig. 3 is a horizontal sectional view therethrough on the line 3—3 of Fig. 2.

In the practical embodiment of my invention I preferably provide a short pipe section 1 adapted for insertion between an incubator, brooder or the like, and its source of heat supply. In Fig. 1 I have shown the pipe section 1 superposed upon a lamp A and between the same and an ordinary incubator boiler B. The pipe section 1 is provided with a reduced side chamber 2 formed by the side plates 3 suitably connected to one another and to the pipe section 1 and having their lower ends closed by a bottom plate 4 leaving the upper end thereof open. The pipe section 1 is divided from its side chamber 2 by means of a swinging gate or damper 5 pivotally mounted at its upper end by means of a transverse rod 6 projecting through the casing of said chamber 2 and adapted to receive a crank 7 on the outer end thereof beyond said casing. Vertical guide members 8 are provided within the chamber 2 having flanges adapted to normally receive the gate or damper 5 thereagainst and providing a transverse plate 9 therebetween adapted to normally support the lower end of said gate or damper. The pipe section 1 and its chamber 2 are thus normally separated by means of the gate or damper 5 allowing the supply of heat to pass directly from the lamp or the source B, to the incubator, brooder or the like. If, however, the heat rises to an excessive point and the gate or damper 5 is swung upon the transverse rod 6, by means of the crank 7, to the position shown in dotted lines in Fig. 2, said chamber will close the pipe section 1 and will deflect the heat which is traversing the same through the reduced chamber 2 and out into the atmosphere through its opening at the upper end thereof, which movements of the heat are designated in Fig. 2 by full line arrows and dotted line arrows respectively.

The means for swinging the gate or damper 5 comprise a thermostat 10 of an expanding metal type which is preferably arranged within the incubator, brooder or the like, to bear upon one end of a centrally pivoted lever 11 connected at its other end to the end of the crank 7 by a chain or other suitable connection 12. Thus it will be seen that when the heat within the incubator rises above a predetermined degree the expansion of the thermostat 10 causes an oscillation of the lever 11 upon its pivot to draw the crank 7 upwardly by virtue of the section 12, and to move the gate or damper 5 to the position shown in dotted lines in Fig. 2 in order that the heat may be deflected into the atmosphere as previously described. In like manner it will be seen that upon the rotation of the heat below the appointed degree, the thermostat 10 will contract upon which the gate or damper 5 will assume its normal position by gravity.

Having thus fully described my invention, I claim:

In an automatic heat regulator, adaptable for insertion between an incubator, brooder, and the like, and its source of heat supply, a cylindrical pipe section having a semi-circular portion of its wall cut out therefrom between the ends thereof, a reduced rectangular communicating side chamber fitting over said cut out portion and having extended sides secured along their edges to said pipe section adjacent and on each side of said cut out portion, said chamber having communication with the atmosphere at its upper end alongside and below the upper end of said pipe section, vertical guides mounted upon the inner surface of said chamber in the same plane with the wall of said pipe section, a rotatable transverse shaft mounted between said pipe section and said chamber and through the upper portion of said chamber, and provided with a crank outside of the wall thereof, a gate or damper fixed upon said transverse shaft to swing therewith, and extending the entire length of said chamber to form the division wall between the same and said pipe section, and resting against said guides at each side thereof, a thermostat arranged within said incubator, brooder, and the like, and connections between said thermostat and said crank for swinging said gate or damper away from said guides and diagonally within said pipe section to close the same and deflect the heat through said side chamber, into the atmosphere below the top of said pipe section, substantially as described.

In testimony whereof I affix my signature in presence of two witnesses.

EARL N. FARNER

Witnesses:
J. L. CAMPBELL.
H. B. CAMPBELL.